United States Patent Office 2,794,023
Patented May 28, 1957

2,794,023

XANTHENIUM COMPOUNDS AND A PROCESS OF PREPARING THEM

Herbert Bestian and Gustav Schäfer, Frankfurt am Main Hochst, and Ferdinand Quint, Frankfurt am Main, Germany, assignors to Farbwerke Hoechst Aktiengesellschaft vormals Meister Lucius und Bruning, Frankfurt am Main, Germany, a company of Germany No Drawing. Application December 23, 1952,
Serial No. 327,668

Claims priority, application Germany December 31, 1951

7 Claims. (Cl. 260—315)

The present invention relates to xanthenium compounds and a process of preparing xanthenium compounds.

U. S. applications Serial Nos. 234,665 and 270,102 for "Triphenylmethane Dyestuffs," filed June 30, 1951, in the name of Gustav Schäfer, and February 5, 1952, in the names of Gustav Schäfer and Ferdinand Quint, respectively, relate to a process of preparing dyestuffs of the triphenylmethane series, wherein resorcinol-sulfophthaleines are caused to react with primary or secondary amines after replacement of the hydroxyl groups, which are in para-positions with respect to the central carbon atom, by exchangeable atoms or atom groups. In this case, the benzene nucleus carrying the sulfonic acid group may contain substituents. The said specification, however, discloses only symmetrical dyestuffs into which the same amino compound has been introduced twice.

Now we have found that asymmetrical xanthenium compounds are obtained by causing 9-phenyl-xanthhydrol-2'-sulfonic acid compounds, which contain in 3.6-position replaceable atoms or atom groups and which may further contain substituents in the benzene nucleus carrying the sulfonic acid group, to react with primary or secondary aromatic amines at a low or moderate temperature and, if desired, sulfonating the condensation products obtained.

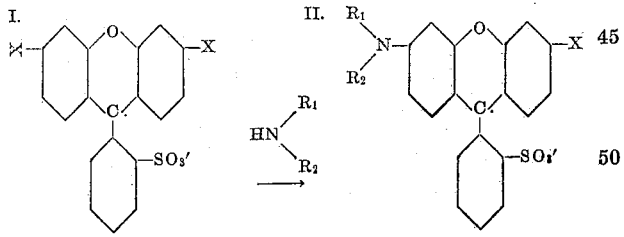

In the above formulae X represents an atom or an atom group capable of being replaced, especially a halogen atom, $R_1$ represents hydrogen or an aliphatic or cycloaliphatic radical, for instance methyl, ethyl, propyl, isopropyl, butyl or amyl, and $R_2$ represents an aromatic radical. Furthermore, the benzene nucleus carrying the sulfo groups may contain substituents such as halogen atoms, hydroxyl groups, alkoxyl groups, carboxylic acid or sulfonic acid groups. The xanthenium compounds used as parent material and corresponding to Formula I above, can, for instance, be obtained by condensing benzene-2-sulfonic acid-1-carboxylic acids with resorcinol in the presence of phosphorus oxyhalides or from resorcinol-sulfophthaleine by replacing the hydroxyl groups which are in para-positions with respect to the central carbon atom, by atoms or atom groups which are capable of being replaced. In this way, for instance, halogen atoms or alkoxy groups can be introduced.

In the preparation of symmetrical triphenyl-methane dyestuffs according to the processes disclosed in the above mentioned applications wherein the reaction of phenylxanthhydrol-sulfonic acid compounds, containing in 3.6-position atoms or atom groups capable of being replaced, with amines is effected in the molecular proportion of 1:2, blue to red dyestuffs are obtained which have a structure analogous to that of the violamines, i. e. the dyestuffs obtained from dichloro-fluorane and amines. It is known that in the preparation of violamines both halogen atoms of dichloro-fluorane enter simultaneously into reaction. It is not possible in this series to isolate, in a satisfactory yield, asymmetrical reaction products from 1 mol of dichloro-fluorane and 1 mol of amine. It is, therefore, very surprising that the replaceable atoms or atom groups in the phenylxanthhydrol-sulfonic acid compounds can be reacted in stages with aromatic amines so that unilateral reaction products are obtained, the reaction having taken place in the molecular proportion 1:1. The unilateral reaction products can be isolated in a very good yield and in a very pure state. Low temperatures, dilution of the reactants with solvents, and avoidance of a great excess of the base promote the formation of unilateral condensation products and prevent the formation of the triphenylmethane dyestuffs described in the applications mentioned above. The unilateral reaction also takes place in the presence of a large excess of the base if the temperature is kept at a value at which the bilateral reaction does not occur. Preferably, the reaction is carried out at temperatures below 100° C.; the most favourable temperature depends upon the reactivity of the amine and the concentration of the reactants. Water and alcohol are particularly suitable solvents and diluents. By addition of acid-binding agents, the reactions can be facilitated and completed.

In most cases, the final products separate in the form of well-developed colored crystals in an almost quantitative yield. They may serve as parent materials for dyestuffs and can themselves be used as dyestuffs, either directly or after sulfonation.

The following examples serve to illustrate the invention, but they are not intended to limit it thereto, the parts being by weight unless otherwise stated, and the relationship of parts by weight to parts by volume being the same as that of the kilogram to the liter.

The present invention especially pertains to xanthenium compounds of the following general formula:

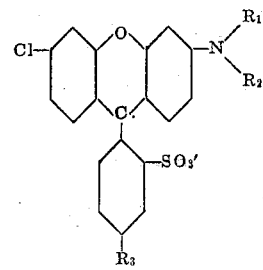

wherein $R_1$ stands for hydrogen or a lower alkyl radical, $R_2$ means an aromatic radical and $R_3$ stands for hydrogen, halogen, the methoxy group, the carboxylic acid or sulfonic acid group.

$R_1$ may represent hydrogen or a lower alkyl radical such as methyl, ethyl, propyl, isopropyl, butyl or amyl. $R_2$ may be an aromatic radical containing one or more aromatic nuclei which can be connected directly or by means of an intermediary atom or atom group. $R_2$ may be an aromatic hydrocarbon radical or an aromatic radical substituted by one or more atoms or atom groups, such as halogen, hydroxyl, alkyl, aralkyl, cyclo-alkyl, alkoxy, aryloxy, nitro, substituted or unsubstituted amino-carboxylic acid, sulfonic acid, sulfonic acid amide, sulfone—especially hydroxyethyl-sufone—trifluoromethyl groups or other groups. Of special value may be $R_2$-radicals wherein the hydroxy group and the carboxylic acid group are present as substituents of adjacent carbon atoms. Furthermore, $R_2$ may be an aromatic radical formed by condensation or substitution of an aromatic nucleus by a heterocyclic ring.

A great number of primary or secondary amino compounds containing the radicals $R_1$ and $R_2$ are named in the examples given hereinafter but the invention is not limited thereto.

*Example 1*

8.1 parts of the internal salt of 3.6-dichloro-9-phenyl-xanthhydrol-2'-sulfonic acid are stirred with 75 parts by volume of methanol for 15 minutes at room temperature. 4.65 parts of aniline are rapidly introduced into the yellow magma obtained. Reaction sets in very quickly with a slight rise of temperature. The internal salt of 3.6-dichloro-9-phenyl-xanthhydrol-2'-sulfonic acid dissolves and, after a short time, the reaction product of the formula indicated below precipitates in the form of small crystals having a bronze lustre. The whole is stirred for 1 hour at room temperature, the product is filtered off with suction and the crystal cake is washed with methanol and hot water. Yield: 9.17 parts of a brown-red glittering crystalline powder.

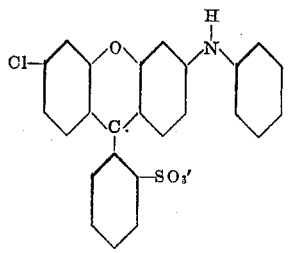

*Example 2*

16.2 parts of the internal salt of 3.6-dichloro-9-phenyl-xanthhydrol-2'-sulfonic acid are well stirred with 100 parts by volume of alcohol. A solution of 12.3 parts of paraanisidine in 75 parts by volume of alcohol is then run in, in one portion, at 15° C.–20° C. Reaction sets in at once while the reaction solution turns an intensive red. After a few minutes the crystallisation of the condensation product sets in. Thereupon stirring is continued for 2 hours at 20° C. The new compound has then separated in the form of small iridescent crystals, which are filtered off with suction and washed several times with alcohol. The filter cake is stirred with 200 parts by volume of hot water which had been made acid to Congo red paper by means of 1 part by volume of concentrated hydrochloric acid. The product is filtered off with suction, washed with hot water and dried. Yield: 19.3 parts.

*Example 3*

8.1 parts of the internal salt of 3.6-dichloro-9-phenyl-xanthhydrol-2'-sulfonic acid are stirred with 40 parts by volume of n-butanol. Thereupon there is added a solution of 4.1 parts of para-nitroaniline in 40 parts by volume of n-butanol, having a temperature of 50° C.–60° C. The reaction sets in while the mixture turns red, and the condensation product crystallises after a few seconds. The reaction mixture is slowly heated to 80° C.–90° C. After heating for ½ hour at 80° C.–90° C., the product is filtered off with suction while still hot and washed several times with methanol. 10.2 parts of a brown, soft powder are obtained.

*Example 4*

8.1 parts of the internal salt of 3.6-dichloro-9-phenyl-xanthhydrol-2'-sulfonic acid are, at room temperature, stirred for 15 minutes with 20 parts by volume of n-butanol. Thereupon a warm solution of 4.8 parts of 2-nitro-4-toluidine in 50 parts by volume of n-butanol is run in and the whole is heated slowly under reflux to gentle boiling. The condensation product soon separates in the form of red crystals. The mixture is kept boiling gently for 1½ hours; it is then allowed to cool to 50° C.–60° C., filtered while still warm, and the product washed several times with methanol until the methanol liquor running through is of a light color. Yield: 4.6 grams of a brick red powder.

*Example 5*

8.1 parts of the internal salt of 3.6-dichloro-9-phenyl-xanthhydrol-2'-sulfonic acid are stirred for 15 minutes with 30 parts by volume of alcohol. Thereupon a solution of 7.74 parts of 1-amino-2-methoxybenzenes-5-sulfonic acid diethylamide in 50 parts by volume of alcohol having a temperature of 50° C.–60° C. is run in. The reaction product separates immediately. The mixture is heated for an additional 2 hours at 50° C.–60° C., filtered with suction while still warm and the product washed repeatedly with methanol. The new compound is obtained in the form of a bright brick red powder. Yield: 12.45 parts.

*Example 6*

8.1 parts of the internal salt of 3.6-dichloro-9-phenyl-xanthhydrol-2'-sulfonic acid are stirred for 15 minutes with 30 parts by volume of methanol until a homogeneous yellow paste has formed. The mixture is cooled to 5° C.–10° C. and a solution of 4.5 parts of para-aminoacetanilide in 60 parts by volume of methanol is run in. Reaction sets in immediately with a blue-violet coloration and the colored condensation product crystallises out. Stirring is continued for 1 hour, 1 part by volume of a solution of 20 parts of potassium acetate in 100 parts by volume of methanol is added, the reaction product is filtered off with suction after 15 minutes and washed on the suction filter with methanol. The new compound is obtained in a yield of 9.2 parts in the form of a dark brown powder which dissolves in hot glycol with a bluish red color.

*Example 7*

16.2 parts of the internal salt of 3.6-dichloro-9-phenyl-xanthhydrol-2'-sulfonic acid are stirred with 60 parts by volume of methanol to a yellow homogeneous paste. A solution of 16.8 parts of 3-amino-N-ethylcarbazole in 150 parts by volume of methanol is added while stirring vigorously. Reaction sets in instantaneously and the condensation product crystallises at once. Stirring is continued for 2 hours at room temperature, the product is filtered off with suction and washed with methanol. For further purification the filter cake is stirred at 80° C. with 250 parts by volume of very dilute hydrochloric acid, the product is filtered off with suction while hot and washed repeatedly with hot water. Yield: 21.6 grams of a black powder.

*Example 8*

30 parts of the internal salt of 3.6-dichloro-9-phenyl-xanthhydrol-2'-sulfonic acid and 35 parts of para-aminophenyl-β-hydroxyethyl sulfone are stirred with 500 parts by volume of alcohol and heated for one hour under reflux to gentle boiling. The condensation product separates as red-brown crystals which are filtered off with suction at 40° C. and washed repeatedly with alcohol on the suction filter. The new compound is obtained as a red-brown powder in a yield of 41.4 parts.

*Example 9*

40 parts of the internal salt of 3.6-dichloro-9-phenyl-xanthhydrol-2'-sulfonic acid and 69 parts of 3-amino-4-methoxyphenyl-β-hydroxyethyl sulfone are stirred with 600 parts by volume of alcohol and heated for 1 hour under reflux to gentle boiling. During the operation the condensation product crystallises in the form of brick red crystals which are filtered off with suction at 40° C.–50° C. The filter cake is stirred for 15 minutes at 80° C. with 500 parts by volume of water, filtered again and washed with hot water. After drying there are obtained 46 parts of a claret powder.

*Example 10*

8.1 parts of the internal salt of 3.6-dichloro-9-phenyl-xanthhydrol-2'-sulfonic acid and 10 parts of 4-amino-3.5-dimethylphenyl-β-hydroxyethyl sulfone in 25 parts by volume of glycol are heated for 4 hours at 100° C. The starting compounds dissolve. From the deep brown-red solution the condensation product separates towards the end of the heating in the form of yellow-red crystals. The mixture is allowed to cool to 50° C.–60° C., 100 parts by volume of N-hydrochloric acid are added dropwise and a further 400 parts by volume of water are slowly run in. The product is filtered off with suction and washed repeatedly with water on the suction filter. Yield: 8.95 parts of a brown powder.

*Example 11*

8.1 parts of the internal salt of 3.6-dichloro-9-phenyl-xanthhydrol-2'-sulfonic acid and 7.65 parts of 1-amino-2-hydroxy-3-benzoic acid are stirred with 150 parts by volume of alcohol and heated for 2 hours under reflux to gentle boiling. The condensation product separates already after a short heating. The product is filtered with suction at 40° C.–50° C. and the filter cake is stirred for 15 minutes at 80° C. with 200 parts by volume of water, which has been acidified with 5 parts by volume of concentrated hydrochloric acid. The product is filtered off again, washed with hot water and dried. Yield: 10.1 parts of a brick red powder which dissolves readily in dilute alkalies imparting a red color to the solution.

In the same way 1-amino-3-hydroxy-4-benzoic acid, 1-amino-4-hydroxy-5-benzoic acid, 1-amino-3-methyl-4-hydroxybenzene-5-carboxylic acid, 1-amino-2-methyl-4-hydroxybenzene-5-carboxylic acid and 1-amino-2-hydroxy-5-methylbenzene-3-carboxylic acid can be reacted with the internal salt of 3.6-dichloro-9-phenyl-xanthhydrol-2'-sulfonic acid.

*Example 12*

16.2 parts of the internal salt of 3.6-dichloro-9-phenyl-xanthhydrol-2'-sulfonic acid are introduced into a solution of 15 parts of 1-amino-2.6-dimethylbenzene in 30 parts by volume of methanol. The solution soon turns deep red while the added compound dissolves. In order to complete the reaction the solution is heated for 30 minutes to 60° C.–70° C. The very dark syrupy solution that has formed is added slowly, while stirring, to 200 parts by volume of hydrochloric acid of 2.1 percent strength. The condensation product precipitates in an amorphous state. In order to convert it into a well defined crystalline product it is heated for ½ hour at 70° C.–80° C. It is filtered with suction while hot and washed repeatedly with hot water. Yield: 18.9 parts of a brick red powder which dissolves easily in methanol or alcohol with a yellow-red color.

The reaction of the internal salt of 3.6-dichloro-9-phenyl-xanthhydrol-2'-sulfonic acid with 1-amino-2.4.6-trimethylbenzene (mesidine) is carried out in the same manner. The condensation product is obtained in an almost theoretical yield as a bright brick red, voluminous crystalline powder.

*Example 13*

8.1 parts of the internal salt of 3.6-dichloro-9-phenyl-xanthhydrol-2'-sulfonic acid are introduced into a solution of 10 parts of 1-methylamino-2.5-dimethylbenzene in 20 parts by volume of methanol. The whole is heated under reflux for ½ hour to gentle boiling. The mixture is worked up by means of dilute hydrochloric acid, with subsequent heating, as described in Example 12. 8.5 parts of a brick red voluminous powder are obtained.

Instead of 1-methylamino-2.5-dimethylbenzene, the same quantity of 1-methylamino-2-methylbenzene may be used. 9.2 parts of the corresponding condensation product are obtained as a brown-red voluminous powder, which dissolves easily in methanol or alcohol with a yellow-red color.

*Example 14*

8.1 parts of the internal salt of 3.6-dichloro-9-phenyl-xanthhydrol-2'-sulfonic acid, 10 parts of 1-amino-2-methyl-6-chlorobenzene, and 20 parts by volume of methanol are heated for 2 hours under reflux to gentle boiling. The major part of the condensation product crystallises already after 1 hour. The mixture is allowed to cool and 50 parts by volume of 2 N-hydrochloric acid are added dropwise. The condensation product crystallises almost completely. It is filtered off with suction and washed repeatedly with hot water. Yield: 9.7 parts of a brick red powder consisting of coarse crystals.

*Example 15*

8.1 parts of the internal salt of 3.6-dichloro-9-phenyl-xanthhydrol-2'-sulfonic acid, 9.6 parts of 1-amino-2-trifluoromethylbenzene and 50 parts by volume of alcohol are heated for 6 hours under reflux to gentle boiling. The former compound dissolves slowly while the solution assumes a red coloration. From the boiling solution the condensation product separates already after a short time in well formed rhombic crystals. The mixture is allowed to cool, is filtered with suction and the residue washed repeatedly on the suction filter with alcohol until the wash liquor has a weak yellow color. Yield: 9.2 parts of a bright yellow-red crystalline powder with a weak bronze lustre.

*Example 16*

8.1 parts of the internal salt of 3.6-dichloro-9-phenyl-xanthhydrol-2'-sulfonic acid, 7.6 parts of 1-amino-2-methyl-4-cyclohexylbenzene, and 50 parts by volume of methanol are rapidly mixed. The condensation product crystallises from the deep brown-red solution that has formed. The mixture is heated for 2 hours at 40° C.–50° C., is filtered with suction and the residue washed repeatedly with methanol. Yield: 10.8 parts of a brown-red voluminous powder.

*Example 17*

8.1 parts of the internal salt of 3.6-dichloro-9-phenyl-xanthhydrol-2'-sulfonic acid and 50 parts by volume of methanol are stirred for 30 minutes. To the yellow homogeneous paste there is added a hot solution of 9 parts of 4-amino-3.2'-dimethyl-azobenzene in 50 parts by volume of methanol. The yellow-red color changes rapidly to dark red and after a short time the condensation product commences to crystallise. Stirring is continued for 3 hours and 2 parts by volume of a solution of 20 parts of potassium acetate in 100 parts by volume of methanol are added. After 15 minutes the mixture is filtered with suction and the residue washed with methanol. For further purification the filter cake is stirred with 200 parts by volume of water at 80° C., filtered off with suction and dried. Yield: 12 parts of a brown-red powder.

*Example 18*

8.1 parts of the internal salt of 3.6-dichloro-9-phenyl-xanthhydrol-2'-sulfonic acid are quickly introduced into a warm solution of 9.5 parts of 1-(4'-aminophenyl)-3-methyl-5-pyrazolone in 150 parts by volume of methanol. A deep red solution forms from which the condensation product crystallizes after a short time as green crystals having a bronze luster. The mixture is stirred for 2 hours at room temperature, 150 parts by volume of water are added, the mixture is filtered with suction and the residue washed repeatedly with hot water. Yield: 10.7 parts of an olive green powder with bronze luster. The compound dissolves easily in dilute alkalies with a brown-red color.

Example 19

8.1 parts of the internal salt of 3.6-dichloro-9-phenyl-xanthhydrol-2'-sulfonic acid, 6.8 parts of sodium dehydrothio-para-toluidine sulfonate, and 50 parts by volume of methanol are rapidly mixed. The starting compounds dissolve very soon. From the deeply colored solution the condensation product crystallises in microscopically small violet crystals. Stirring is continued for 1 hour at 20° C.–25° C. and 11 parts by volume of a solution containing 20 parts of potassium acetate in 100 parts by volume of methanol are added. The potassium salt of the condensation product commences to crystallise. After 30 minutes it is filtered off with suction and washed, first with a little methanol and then with acetone. The filter cake has a marked bronze luster. Yield: 9 parts of a violet powder which is slightly soluble in cold water and easily soluble in hot water. The condensation product dyes cotton directly in red-violet tints.

Example 20

9.7 parts of the internal salt of 3.6-dichloro-9-phenyl-xanthhydrol-2'.4'-disulfonic acid are stirred for 15 minutes with 50 parts by volume of methanol. 5 parts of aniline are added, whereupon the solution at once assumes an intensive red coloration. The condensation product separates in a form that can easily be filtered. Stirring is continued for 2 hours and the product is filtered with suction and washed with methanol. The brown somewhat bronze filter cake is stirred with 100 parts by volume of hydrochloric acid of 10 percent strength. The product is again filtered with suction and washed with very dilute hydrochloric acid. Yield: 5.8 parts of a brown voluminous powder which dissolves easily in dilute alkalies with a yellow-red color.

Example 21

6 parts of the internal salt of 3.6-dichloro-9-phenyl-xanthhydrol-2'-sulfonic acid are stirred, at room temperature, with 6.5 parts of ammonium 4-amino-diphenyl-amino-2-sulfonate in a mixture of 80 parts by volume of methanol and 20 parts of water. Crystals of a dark color separate after a short time from the dark violet solution. On completion of the reaction they are filtered off with suction. The condensation product can further be purified by dissolving it in sodium carbonate solution and salting out. It dyes wool and silk, according to its coloring strength, in gray and black tints which are fast to light and washing.

Example 22

12 parts of the internal salt of 3.6-dichloro-9-phenyl-xanthhydrol-2'-sulfonic acid are reacted at 50° C.–60° C. with 7 parts of sodium 1-aminobenzene-3-sulfonate in 80 parts by volume of glycol. The condensation product separates in the form of brick red crystals. It is filtered off with suction, dissolved in a little water with addition of a little sodium carbonate and salted out with magnesium chloride.

Example 23

8 parts of the internal salt of 3.6-dichloro-9-phenyl-xanthhydrol-2'-sulfonic acid are stirred, for several hours at 40° C., with 7.4 parts of sodium 1-amino-2-hydroxy-5-sulfo-3-benzoate in 80 parts by volume of ethyl alcohol. After cooling and filtering with suction, the condensation product is obtained as a dark red powder. If the reaction is carried out with sodium 1-amino-4-hydroxy-3-sulfo-5-benzoate, the isomeric condensation product is formed as a dark brown powder.

Example 24

64 parts of the internal salt of 3.6-dichloro-9-phenyl-xanthhydrol-2'.4'-disulfonic acid are heated, for 5 hours at 50° C., with 2904 parts of 1-methylamino-2-methyl-benzene in 300 parts by volume of methanol. The mixture is diluted with 1 liter of water, 10 parts of concentrated hydrochloric acid are added, and the whole is slightly warmed on the steam bath. The condensation product separates as a dark red resin which is digested repeatedly with dilute hydrochloric acid in order to remove the excess of the base. The resin, which is brittle in the cold and which can easily be pulverized, consists of a brick red powder. Yield: 46.3 parts.

Example 25

If the internal salt specified in Example 24 is condensed with mesidine instead of with 1-methylamino-2-methylbenzene, a bright red powder is obtained when applying the same method of working.

Example 26

9.4 parts of the internal salt of 3.6-dichloro-9-phenyl-xanthhydrol-4'-methoxy-2'-sulfonic acid in 50 cc. of methanol are heated for 1 hour to gentle boiling with 5 parts of 1-amino-4-methylbenzene and worked up as described in Example 24. The condensation product consists of a red powder.

Example 27

5 parts of the internal salt of 3.6-dichloro-9-phenyl-xanthhydrol-4'-carboxy-2'-sulfonic acid in 30 cc. of methanol are heated for 2 hours to boiling with 3 parts of 1-amino-4-ethoxybenzene. The mixture is poured into dilute hydrochloric acid, filtered with suction and the residue washed with water. The condensation product is obtained in a good yield as a red powder.

Example 28

4 parts of the internal salt of 3.6-dichloro-9-phenyl-xanthhydrol-2'-sulfonic acid and 50 parts by volume of methanol are stirred, for 4 hours at 20° C., with 1.5 parts of 1-ethylamino-2-methylbenzene. By addition of water the condensation product is precipitated and is then dried. It consists of a dark brown powder.

Example 29

4 parts of the internal salt of 3.6-dichloro-9-phenyl-xanthhydrol-2'-sulfonic acid and 50 parts by volume of methanol are stirred for several hours with 1.7 parts of butylaminobenzene, in the course of which the condensation product partly precipitates. In order to complete the precipitation water is added, and the precipitated mass is dried. A dark brown powder is obtained.

Example 30

4 parts of the internal salt of 3.6-dichloro-9-phenyl-xanthhydrol-2'-sulfonic acid, 50 parts by volume of methanol and 1.5 parts of ethylaminobenzene are condensed for 6 hours at room temperature. The product is filtered with suction and dried. The final product consists of a red-brown voluminous powder.

Example 31

4.5 parts of the internal salt of 3.6.4'-trichloro-9-phenyl-xanthhydrol-2'-sulfonic acid, 50 parts by volume of methanol and 1.5 parts of 1-ethylaminobenzene are stirred at room temperature. The condensation product is isolated by precipitation with water. After drying it consists of a red-brown powder.

Example 32

4.5 parts of the internal salt of 3.6.4'-trichloro-9-phenyl-xanthhydrol-2'-sulfonic acid, 50 parts by volume of water and 3 parts of sodium 4-aminodiphenyl ether-2-sulfonate are condensed at 30° C.–40° C. Subsequently the product is salted out by addition of sodium chloride; it is then filtered and dried. 5 parts of a black-brown condensation product are obtained.

We claim:
1. Xanthenium compounds of the general formula

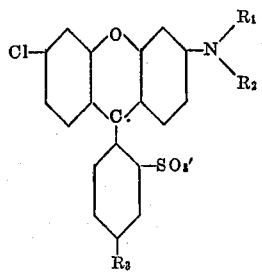

wherein $R_1$ stands for a member of the group consisting of hydrogen and lower alkyl, $R_2$ means a member selected from the group consisting of radicals of the benzene series, N-ethyl-carbazole and 1-phenyl-3-methyl-5-pyrazolones and $R_3$ stands for a member of the group consisting of hydrogen, chlorine, the methoxy, the carboxyl, and the sulfonic acid group.

2. Xanthenium compounds of the general formula

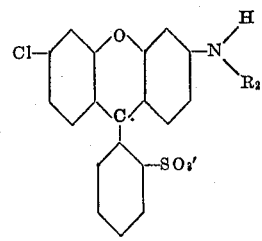

wherein $R_2$ stands for a member selected from the group consisting of radicals of the benzene series, N-ethyl-carbazole and 1-phenyl-3-methyl-5-pyrazolones.

3. The compound of the formula

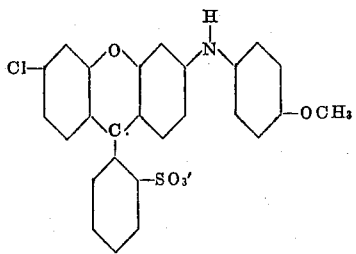

4. The compound of the formula

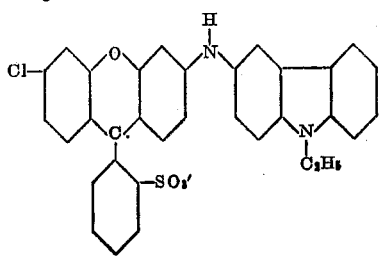

5. The compound of the formula

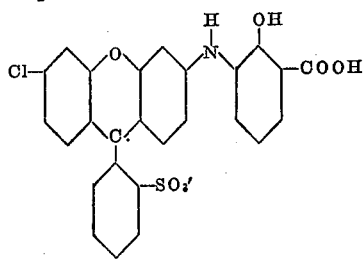

6. The compound of the formula

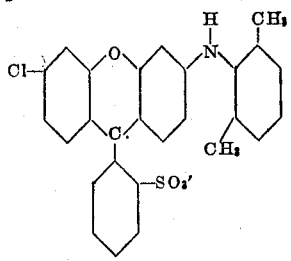

7. The compound of the formula

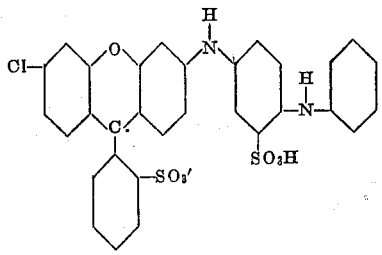

References Cited in the file of this patent
UNITED STATES PATENTS

| | | |
|---|---|---|
| 2,071,130 | Krzikalla, et al. | Feb. 16, 1937 |

FOREIGN PATENTS

| | | |
|---|---|---|
| 18,017 | Great Britain | July 2, 1898 |
| 466,823 | Canada | July 25, 1950 |
| 848,231 | Germany | Sept. 1, 1952 |

OTHER REFERENCES

Gibbs et al.: J. A. C. S., vol. 50, pp. 1755–1762 (1928).
Orndorff et al.: J. Am. Chem. Soc., vol 46, pp. 1896–1912 (1924).